(No Model.)  4 Sheets—Sheet 1.

G. J. B. RODWELL.
APPARATUS FOR MANUFACTURING RUBBER STAMPS.

No. 511,548. Patented Dec. 26, 1893.

WITNESSES:

INVENTOR:
George J. B. Rodwell
By Dudley Laass & Bull
his ATTORNEYS.

(No Model.) 4 Sheets—Sheet 2.
G. J. B. RODWELL.
APPARATUS FOR MANUFACTURING RUBBER STAMPS.
No. 511,548. Patented Dec. 26, 1893.

WITNESSES:
C. L. Bendixon
H. M. Seamans

INVENTOR:
George J. B. Rodwell
By Duell, Laass & Duell
his ATTORNEYS.

(No Model.) 4 Sheets—Sheet 3.

G. J. B. RODWELL.
APPARATUS FOR MANUFACTURING RUBBER STAMPS.

No. 511,548. Patented Dec. 26, 1893.

WITNESSES:
INVENTOR:

(No Model.) 4 Sheets—Sheet 4.

G. J. B. RODWELL.
APPARATUS FOR MANUFACTURING RUBBER STAMPS.

No. 511,548. Patented Dec. 26, 1893.

WITNESSES:
C. L. Bendixon
H. M. Seamans

INVENTOR:
George J. B. Rodwell
By Duell, Laass & Duell
his ATTORNEYS.

THE NATIONAL LITHOGRAPHING COMPANY,
WASHINGTON, D. C.

UNITED STATES PATENT OFFICE.

GEORGE J. B. RODWELL, OF BUFFALO, NEW YORK, ASSIGNOR OF TWO-THIRDS TO SAMUEL J. MOORE AND HERBERT C. SECORD, OF TORONTO, CANADA.

APPARATUS FOR MANUFACTURING RUBBER STAMPS.

SPECIFICATION forming part of Letters Patent No. 511,548, dated December 26, 1893.

Application filed February 11, 1893. Serial No. 461,949. (No model.)

*To all whom it may concern:*

Be it known that I, GEORGE J. B. RODWELL, of Buffalo, in the county of Erie, in the State of New York, have invented new and useful Improvements in Apparatus for Manufacturing Rubber Stamps, of which the following, taken in connection with the accompanying drawings, is a full, clear, and exact description.

This invention relates to the manufacture of vulcanized rubber stamps by the combined agency of pressure and dry heat; and the invention consists in an improved construction of an apparatus whereby the aforesaid stamps can be manufactured in a more convenient, expeditious and perfect manner as hereinafter fully described and set forth in the claim.

Figure 1:
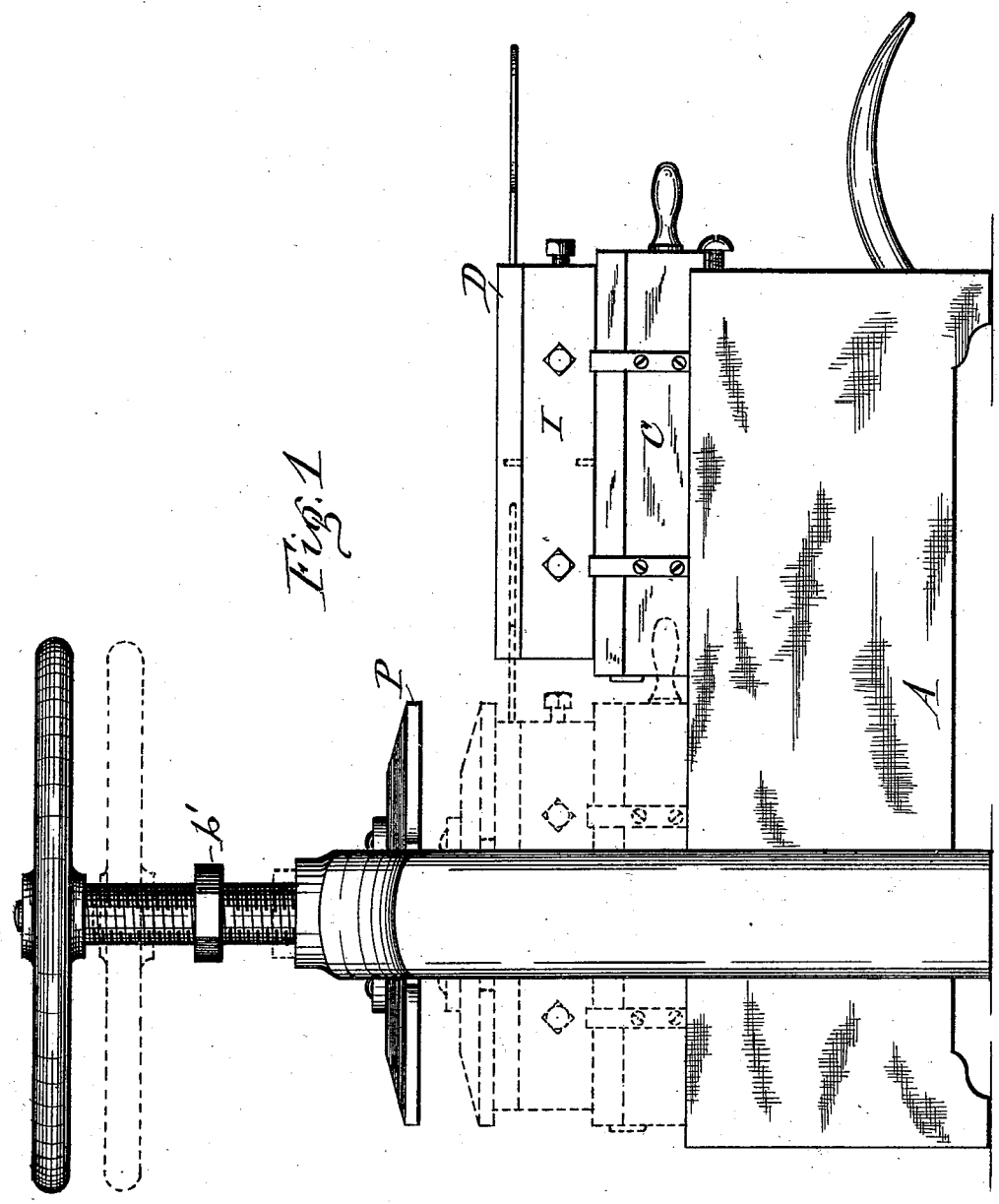
Figure 2:
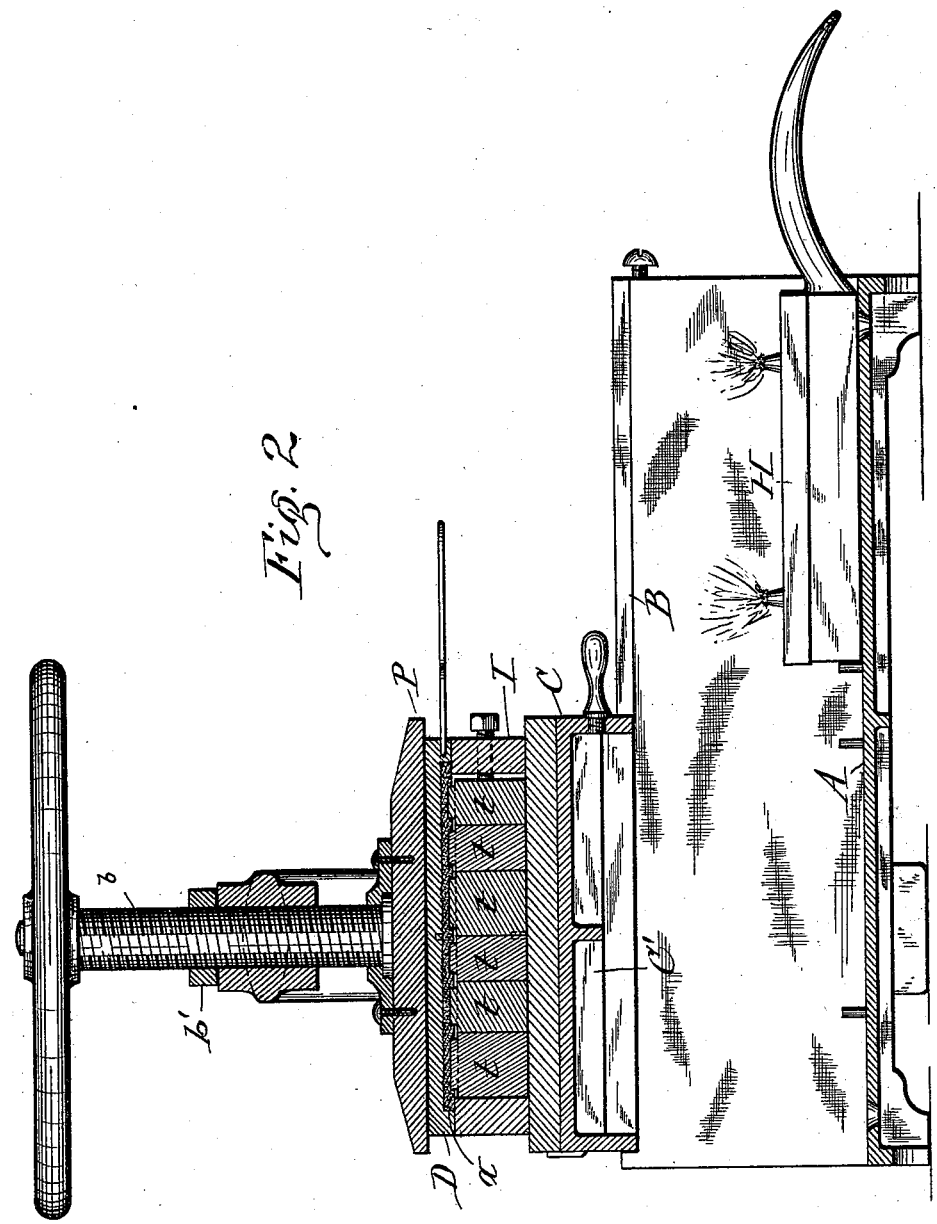
Figure 3:
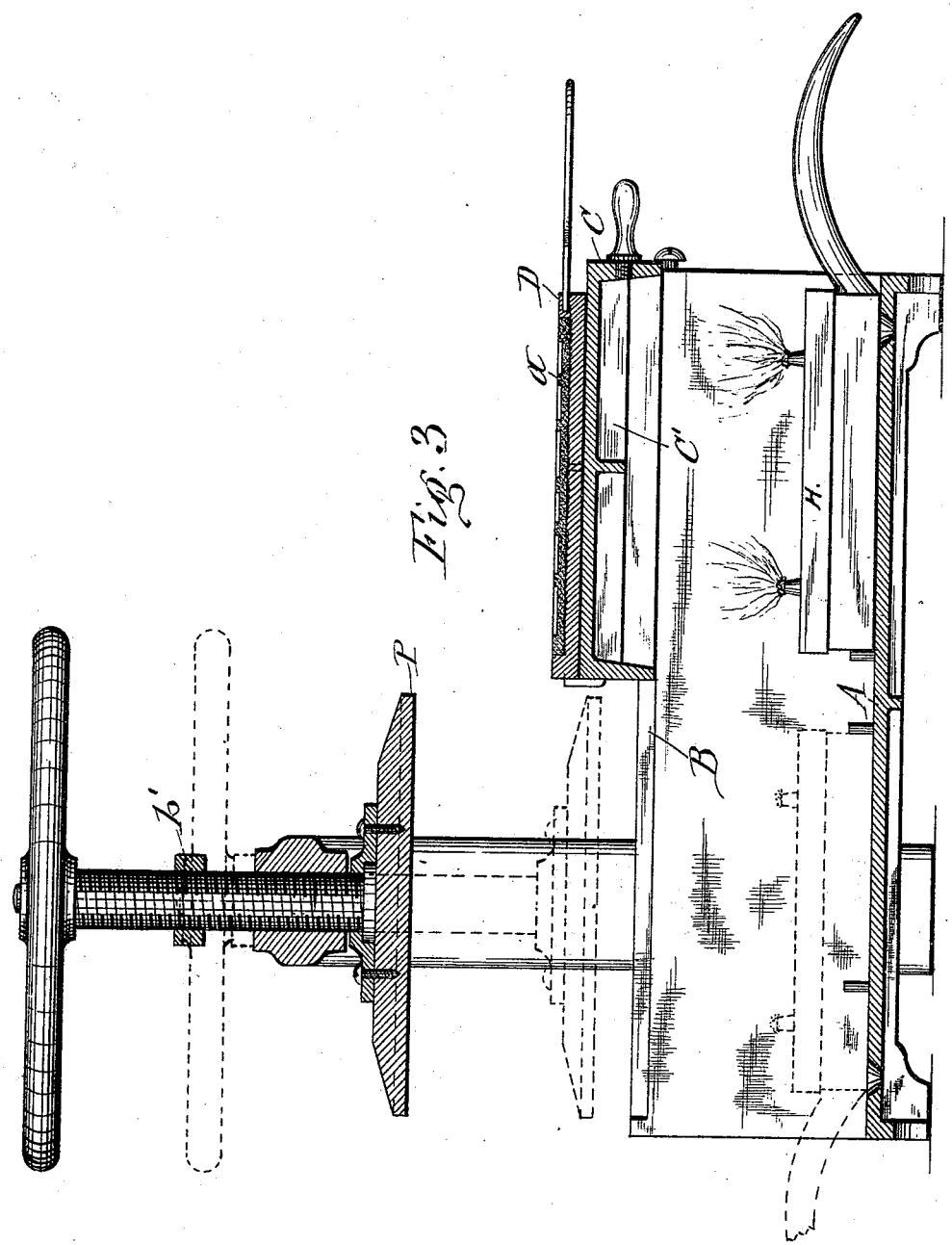
Figure 4:
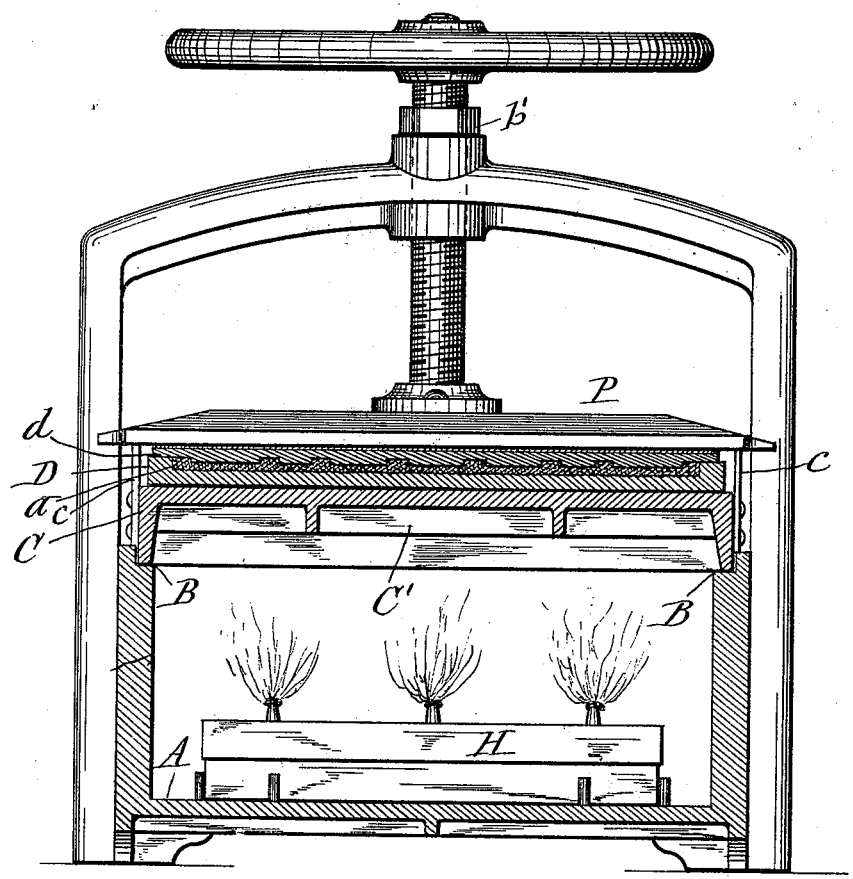

In the annexed drawings, Figure 1, is a side elevation showing the apparatus in its condition for the commencement of the process of manufacturing stamps of vulcanized rubber. Fig. 2, is a central longitudinally vertical section showing said apparatus in its condition during the second step of the aforesaid process. Fig. 3 is a longitudinal section showing said apparatus in its condition for the third step of the process, and Fig. 4 is a vertical transverse section illustrating its operation in completing the aforesaid process.

A— represents an elongated horizontal bed, from opposite sides of which rise two solid walls forming a tunnel which is open at the top, and provided with parallel longitudinal guides —B—B— on the tops of said walls. Over one end of the aforesaid tunnel is arranged a suitable press-head or follower —P— of a press. The said press-head is adapted to be raised a sufficient distance above the guides —B—B— to permit the following devices to be placed under the press-head. Upon the guides —B—B— is mounted a table —C— which is movable longitudinally to and from under the aforesaid press-head.

D— represents a metallic pan in which I form the mold or matrix for the stamp to be formed as hereinafter explained. I form the said matrix by filling the pan with plastic cement, preferably composed of plaster of paris mixed with sufficient clay or other material to retard the setting thereof without impairing its rigidity when set. While said composition is in a plastic condition, I make therein an impression of the fac-simile of the face-stamp to be produced. When the said impression can be made by printers' types —t—t— I place said types into a chase —I— and firmly secure them therein in the usual manner. This chase with its type secured thereto I place upon the table —C— with the types —t—t— facing upward and then place the pan in an inverted position with the plastic cement adhering thereto upon the face of the aforesaid types, which latter had previously been faced with suitable oil to prevent the cement from adhering to them. I then push the table —C— along on the guides —B—B— so as to bring the pan —D— directly under the press-head —P— as indicated by dotted lines in Fig. 1 of the drawings. I then operate the press to bring the press-head down upon the pan with sufficient pressure to properly make the impression of the types in the cement. The interior of the pan is roughened to obtain a sufficient hold upon the cement to prevent its dropping out of the pan in the operation of inverting the latter.

In order to gage the movement of the press-head so as to prevent undue pressure on the plastic cement and impart the proper thickness to the mold, I attach to the screw —b— of the press, a collar —b'— which can be so adjusted that by contact with the top of the press-frame it arrests the movement of the screw, as represented in Fig. 2 of the drawings. After the impression has thus been made in the plastic cement I raise the press-head or follower and draw the table —C— with the chase —I— and pan —D— back from under the press as illustrated by full lines in Fig. 1 of the drawings. I then remove the pan —D— from the chase —I— and remove the latter from the table —C—, then replace the pan —D— with its back upon the table —C—, and then heat and dry the cement in the pan by placing under the table a lighted lamp or other suitable movable heater —H—, as shown in Fig. 3 of the drawings. To allow the table to conduct the heat more quickly to the pan I form said table hollow or with a cavity —C'— in its under side. After the pan with the mold has been sufficiently dried and heated I transfer the lamp or heater —H— to a position directly under the press-head or follower —P— and bring the press-head down as indicated by dotted lines in said Fig. 3, and thereby heat the said press head to the proper vulcanizing heat. In the meantime I place upon the matrix formed of the hardened cement in the pan a sheet of rubber $d$ and cover the top of the said rubber sheet with paper or cloth. I then raise the press-head and push the table with the matrix resting thereon forward under the said press-head, and then operate the press to cause the press-head to press upon the rubber with sufficient force to cause the matrix to make its impression in the rubber.

In order to insure a uniform thickness across the entire length and width of the compressed rubber I attach to opposite sides of the table —C—, gages —c—c— with which the press-head comes in contact when brought down the desired distance, as represented in Fig. 4 of the drawings. During this latter step of the process the lamp or heater is maintained under the table for a sufficient period to vulcanize the sheet of compressed rubber. After this is effected I extinguish the light or remove the heater and raise the press-head, and then draw back the table —C— and remove the vulcanized rubber sheet from the matrix.

Among the salient features of my invention are the solid walled tunnel with the lamp movable lengthwise thereof, said tunnel confining the flame of the lamp under the table —C— and follower —P—, under either of which the lamp is adapted to be placed, and thus said table and follower are heated quicker and more effectually.

What I claim as my invention is—

The improved apparatus for manufacturing vulcanized rubber-stamps, consisting of the solid walled tunnel —A— having its top open and formed with the ways —B—, the table —C— mounted slidably on said ways and formed with the heating recesses —C'— in its under side, the pan —D— seated on said table, the matrix —$a$— seated in the pan, the press-follower —P— over one end of the tunnel, and the lamp —H— seated in the tunnel movable lengthwise thereof to be placed either directly under the press or under the matrix-supporting table removed from the press substantially as described and shown.

In testimony whereof I have hereunto signed my name this 2d day of February, 1893.

GEORGE J. B. RODWELL. [L. S.]

Witnesses:
 A. D. WILSON,
 GEORGE SLADE.